Jan. 10, 1967    H. C. HERVIG    3,296,688
ADJUSTABLE CENTERING SPACER
Filed July 8, 1964
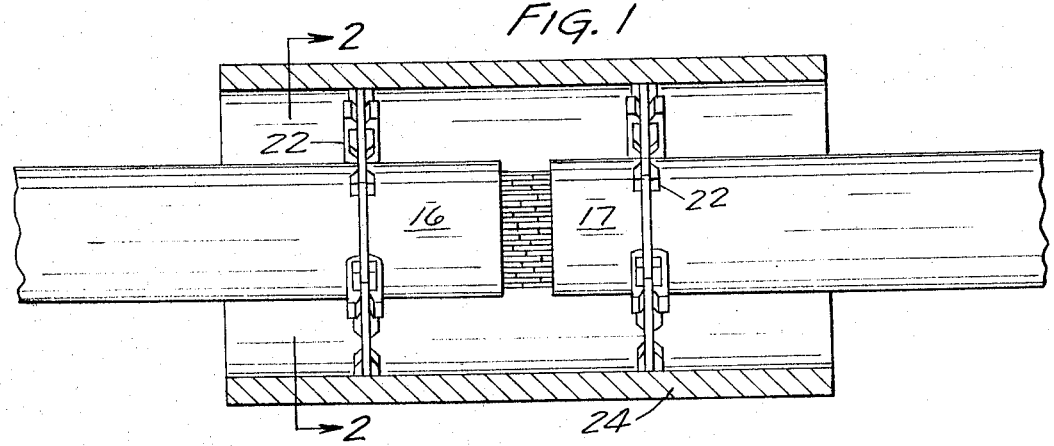
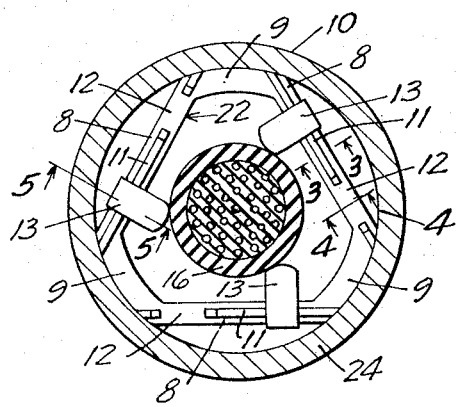 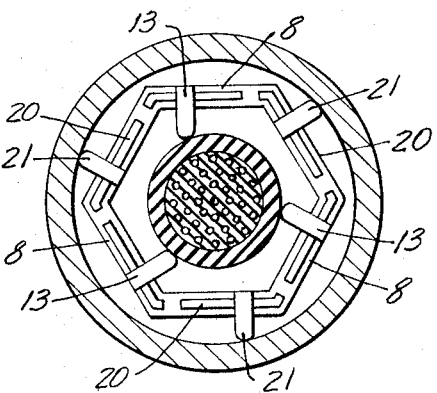
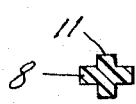  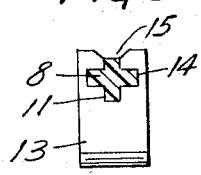 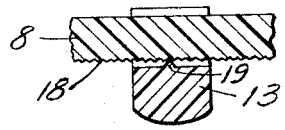
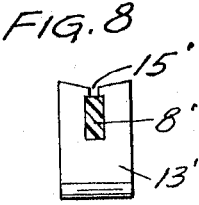
INVENTOR.
HAROLD C. HERVIG
BY
Carpenter, Abbott, Coulter & Kinney
ATTORNEYS

United States Patent Office 3,296,688
Patented Jan. 10, 1967

3,296,688
ADJUSTABLE CENTERING SPACER
Harold C. Hervig, St. Paul, Minn., assignor to Minnesota Mining and Manufacturing Company, St. Paul, Minn., a corporation of Delaware
Filed July 8, 1964, Ser. No. 381,049
4 Claims. (Cl. 29—272)

This invention relates to devices suitable for centrally mounting cylindrical objects within tubular shells wherein the cross-section of the cylindrical object is substantially smaller than the tubular boring of the shell.

A particular application of the present device is the centering of electrical cable sections within outer tubular protective shells or casings. Heretofore devices that were employed to accomplish such centering of electrical cable sections were specifically designed to fit a particular sized cable and a particular sized bore. It is an object of the present invention to provide a standardized centering device that has adjustable centering means that will adapt to the perimeters of different sized cables. Other desirable attributes include simplicity of construction, low cost, and easy installation and operation.

In general, the objects of the invention are accomplished by a construction which comprises a flat frame made up of three or more legs assembled into an equiangular configuration and including spacers slidably mounted on each of said legs and adjustable along the length thereof. By mounting said spacers so that they extend inwardly from said legs, the central opening within the configuration can be increased or decreased by positioning said spacers respetcively farther from or closer to the mid point on the legs. When a cable section is properly located within said opening, the spacers are co-operatively adjusted toward the mid points on their respective legs until they are abutted against the cable where they are held by locking means, to be explained in the following detailed description thereby to maintain a fixed central positioning of the cable.

The invention and its objects will be more fully understood by reference to the following detailed description and drawings in which:

FIGURE 1 illustrates in side elevation and partly in section a plurality of centering devices of the invention as installed over a cable and within a cable splice mold;

FIGURE 2 is a front elevation of a preferred embodiment of the centering device of FIGURE 1 in position on a cable and within a mold as shown in cross-section;

FIGURE 3 is a cross-sectional view along lines 3—3 of FIGURE 2;

FIGURE 4 is a cross-sectional view taken on lines 4—4 of FIGURE 2;

FIGURE 5 is a cross-sectional view taken on lines 5—5 of FIGURE 2;

FIGURE 6 illustrates a detail of an alternative locking means structure;

FIGURE 7 is similar to FIGURE 2 and illustrates an alternative embodiment of the invention; and FIGURE 8 illustrates an alternative form of spacer element.

Referring to FIGURES 2–5, the centering device 22 comprises a flat frame having three straight legs 8 angularly disposed to form portions of the sides of an equilateral and equiangular triangle and being interconnected by short arcuately curved rigid braces 9. Said legs and braces are dimensioned to fit closely within a tubular shell 10 with the curved outer edge of the braces 9 providing the supporting contact with the cylindrical wall of the tube.

Each leg 8 has a cross-shaped section as shown at FIGURE 3 and each spacer 13 is provided with a correspondingly cross-shaped channel 14 having dimensions sufficiently larger than those of the cross-shaped section of the legs to permit freely slidable positioning of the spacers thereon. The crossbars or ribs 11 are omitted at a short portion 12 of the leg to provide a rectangular cross-section as shown at FIGURE 4. The spacer 13 is placed over the leg 8 at the portion 12, being provided with an open side 15 for that purpose. The spacer is then slid to the far end of the cross-shaped section. The structure permits easy assembly of the pieces and is preferred where the spacers are rigid or relatively inflexible.

Another and simpler structure, indicated in FIGURE 8, is preferred where materials of adequate flexibility are permitted. The entire leg 8 is of constant rectangular cross-section. The spacer 13' has an opening 15' of less width than the thickness of the leg, so that the spacer must be sprung over the leg in assembling the adapter.

Referring to FIGURE 1, before cable ends 16 and 17 are spliced together the tubular shell 24 and the centering devices 22 are slipped onto the cable section, as for example, by placing the tubular shell over the free end of cable 16 and the devices 22 over the free end of cable 17. The cables are spliced together and the centering devices are positioned at both sides of the splice. The spacers are then slid along the legs until the extended ends press tightly against the cable, with care taken to see that all of the spacers are positioned at the same relative point on their respective legs. Thus the cable will be centrally positioned within the frames and accordingly, centrally positioned within the tubular mold 24 when the same is slid over the frames.

As the spacers are slid against the cable by forces applied from adjacent the supporting legs, they become cocked or twisted on the legs, thereby being tightly frictionally retained in position. Mechanical holding means may be supplied where a more secure or permanent means of holding is desired, as an example, the inward side of each leg 8 may be provided with ratchet teeth 18, the matching side of the spacer forming a pawl 19, as illustrated in FIGURE 6. However the frictional forces provided by the cocked or offset spacers are ordinarily fully adequate, e.g. to supply the temporary support needed for maintaining the cable in centered position prior to filling the mold with self-hardening sealing compound.

A more versatile but somewhat more complicated alternative embodiment of the invention is illustrated in FIGURE 7. Legs 8 and spacers 13 are constructed and operate in the same manner as described above. The braces 9 however are replaced with connecting legs 20 which are also provided with slidable spacers 21 that operate in a manner similar to spacers 13 execept that they extend outwardly. Thus the spacers 21 can be positioned on said arms 20 to accommodate different sizes of protective tubular shells. When they are midway on the legs they are at their closest point to the center and this position determines the smallest size shell that the device will accommodate. As the spacers are moved toward one end of their respective legs, they move further away from the center to provide contact with larger shells. The legs 8 of FIGURES 2 and 7, and the legs 20 of FIGURE 7, are illustrated as being essentially straight; and this structure is preferred particularly for adapters which are to be mass-produced by plastic molding techniques. The devices may alternatively be provided with curved leg elements, a moderate inward bow, for example, being effective in changing the range of cable sizes which may be accommodated. However the difficulty and added expense of preparing molds for making such structures is ordinarily unwarranted.

It will be understood that the adjustment for the various size shells can be incorporated independently of the cable adjustment. Also, the spacers and frame can be of various types of material depending on the particular situations encountered. As an example, where electrical cables are being centered, the spacers may desirably be constructed of an electrically non-conductive material, e.g. nylon, polystyrene, cellulose acetate butyrate, or ceramic. The more flexible plastic materials are useful in any of the structures described, whereas the structure of FIGURE 8 cannot be employed with ceramic spacer materials and is not fully satisfactory with plastic materials of low flexibility such as polystyrene. It will be further understood that the particular constructions described and illustrated herein represent preferred but non-limiting embodiments and various changes can be made without departing from the scope of the invention.

What is claimed is:

1. A centering device, suitable for centrally mounting a cylindrical object within a tubular shell of substantially larger cross-section, comprising a flat frame having at least three straight legs the ends of which are interconnected in equiangular configuration thereby permitting the insertion within the frame of cylindrical objects, and an inwardly extending spacer slidably mounted along the length of each of said legs adapted to engage cylindrical objects of various sizes positioned within said frame.

2. A centering device, suitable for centrally mounting a cylindrical object within a tubular shell of substantially larger cross-section, comprising a flat frame having at least three straight and equilateral legs interconnected in equiangular configuration, each of said legs having a rib extending along the major portion of the length of the leg, and inwardly extended spacers slidably mounted one along the length of each of said legs, each of said spacers having an open-mouthed channel with a cross-section similar to the cross-section of the ribbed portion of the legs to permit slidable positioning of said spacers and being adapted to engage cylindrical objects of various sizes positioned within said frame, the rib-free portion of the legs permitting insertion of the leg through the mouth of the channel of the spacers to facilitate assembly of the two pieces.

3. A device as defined in claim 2 wherein each said leg is provided with ratchet teeth and each said spacer is provided with a pawl for engaging said ratchet teeth to secure the spacer in position when in contact with an engaged cylindrical object.

4. A centering device suitable for centrally mounting a cylindrical object within a tubular shell of substantially larger cross-section, comprising a flat frame having at least three straight and equilateral legs interconnected in equiangular configuration, said legs being uniformly rectangular in cross-section, and inwardly extended spacers slidably mounted one along the length of each of said legs adapted to engage cylindrical objects of various sizes positioned within said frame, said spacers having a rectangular central passage-way, corresponding to the rectangular cross-section of the legs, between resiliently flexible side members spaced from each other adjacent one end of said passage-way to provide an expandable entrance channel for said leg.

References Cited by the Examiner

UNITED STATES PATENTS

| 1,448,528 | 3/1923 | Elliott | 29—272 |
| 1,757,479 | 5/1930 | Schmidt et al. | 138—148 X |
| 1,889,986 | 12/1932 | Haywood. | |
| 2,658,530 | 11/1953 | Kaiser | 138—148 X |

FOREIGN PATENTS

| 396,844 | 2/1909 | France. |

WILLIAM FELDMAN, *Primary Examiner.*

J. C. PETERS, *Assistant Examiner.*